(12) United States Patent
Athas et al.

(10) Patent No.: US 9,601,932 B2
(45) Date of Patent: *Mar. 21, 2017

(54) BALANCING VOLTAGES BETWEEN BATTERY BANKS

(71) Applicant: Apple Inc., Cupertino, CA (US)

(72) Inventors: William C. Athas, San Jose, CA (US); Thomas C. Greening, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/594,621

(22) Filed: Jan. 12, 2015

(65) Prior Publication Data

US 2015/0123618 A1 May 7, 2015

Related U.S. Application Data

(63) Continuation of application No. 13/360,980, filed on Jan. 30, 2012, now Pat. No. 8,933,665, which is a (Continued)

(51) Int. Cl.
*H02J 7/00* (2006.01)
*H02M 3/07* (2006.01)

(52) U.S. Cl.
CPC .......... *H02J 7/0019* (2013.01); *H02J 7/0016* (2013.01); *H02M 3/07* (2013.01); *Y10T 307/696* (2015.04)

(58) Field of Classification Search
USPC ....................................................... 320/118
See application file for complete search history.

(56) References Cited

U.S. PATENT DOCUMENTS

| 4,792,886 A | 12/1988 | Sahm |
| 4,807,104 A | 2/1989 | Floyd |

(Continued)

FOREIGN PATENT DOCUMENTS

| CN | 1675610 A | 9/2005 |
| CN | 1761136 A | 4/2006 |

(Continued)

OTHER PUBLICATIONS

Athas, W.C. et al., "A Resonant Signal Driver for Tow-Phase, Almost-Non-Overlapping Clocks", pp. 132, 1996.

(Continued)

*Primary Examiner* — Samuel Berhanu
(74) *Attorney, Agent, or Firm* — Blank Rome LLP

(57) ABSTRACT

A system that balances voltages between battery banks. The system includes battery banks, including a first bank and a second bank, and a first capacitor. The system also includes a first set of switching devices which selectively couple first and second terminals of the first capacitor to first and second terminals of the first bank, and to first and second terminals of the second bank. The system includes a clocking circuit which generates clock signals with substantially non-overlapping first and second clock phases. This clocking circuit is configured so that during the first phase the first and second terminals of the first capacitor are coupled to the first and second terminals of the first bank, respectively, and during the second phase the first and second terminals of the first capacitor are coupled to the first and second terminals of the second bank, respectively.

17 Claims, 6 Drawing Sheets

Related U.S. Application Data continuation-in-part of application No. 12/535,974, filed on Aug. 5, 2009, now Pat. No. 8,320,141.

(56) References Cited

U.S. PATENT DOCUMENTS

| | | | |
|---|---|---|---|
| 5,051,881 | A | 9/1991 | Herold |
| 5,187,421 | A | 2/1993 | Naito |
| 5,396,195 | A | 3/1995 | Gabara |
| 5,559,478 | A | 9/1996 | Athas |
| 5,677,077 | A | 10/1997 | Faulk |
| 5,684,682 | A | 11/1997 | Zhong |
| 5,760,637 | A | 6/1998 | Wong |
| 5,920,235 | A | 7/1999 | Beards |
| 6,028,374 | A | 2/2000 | Razak |
| 6,064,277 | A | 5/2000 | Gilbert |
| 6,169,673 | B1 | 1/2001 | Mcintyre |
| 6,188,590 | B1 | 2/2001 | Chang |
| 6,249,192 | B1 | 6/2001 | Gabara |
| 6,518,725 | B2 | 2/2003 | Marten |
| 6,559,492 | B1 | 5/2003 | Hazucha |
| 6,559,689 | B1 | 5/2003 | Clark |
| 6,573,695 | B2 | 6/2003 | Shashoua |
| 6,624,612 | B1 * | 9/2003 | Lundquist ............... 320/118 |
| 6,650,163 | B1 | 11/2003 | Burns |
| 6,650,555 | B2 | 11/2003 | Suzuki |
| 6,738,271 | B2 | 5/2004 | Umeda |
| 6,744,224 | B2 | 6/2004 | Ishii |
| 6,806,686 | B1 * | 10/2004 | Thrap ............... 320/118 |
| 7,288,919 | B2 | 10/2007 | Morita |
| 7,430,133 | B1 | 9/2008 | McIntyre |
| 7,737,767 | B2 | 6/2010 | Oyama |
| 7,888,910 | B2 | 2/2011 | Zeng |
| 8,320,141 | B2 | 11/2012 | Athas |
| 8,519,670 | B2 | 8/2013 | Castelaz |
| 2002/0041503 | A1 | 4/2002 | Roohparvar |
| 2002/0110009 | A1 | 8/2002 | Umeda |
| 2002/0190692 | A1 | 12/2002 | Marten |
| 2004/0196095 | A1 | 10/2004 | Nonaka |
| 2004/0246635 | A1 | 12/2004 | Morita |
| 2005/0134234 | A1 * | 6/2005 | Kaiser ............... 320/166 |
| 2006/0055481 | A1 | 3/2006 | Takahashi |
| 2006/0197583 | A1 | 9/2006 | Yen |
| 2006/0290388 | A1 | 12/2006 | Tolle |
| 2008/0018301 | A1 * | 1/2008 | Morita ............... 320/119 |
| 2009/0140694 | A1 | 6/2009 | Zeng |
| 2009/0167418 | A1 | 7/2009 | Raghavan |
| 2009/0309566 | A1 | 12/2009 | Shiu |
| 2010/0019749 | A1 | 1/2010 | Katsuya |
| 2010/0176763 | A1 | 7/2010 | Yen |
| 2010/0237830 | A1 | 9/2010 | Castelaz |
| 2011/0031956 | A1 | 2/2011 | Athas |
| 2011/0032043 | A1 | 2/2011 | Athas |
| 2012/0306584 | A1 | 12/2012 | Cao |

FOREIGN PATENT DOCUMENTS

| | | |
|---|---|---|
| CN | 1938926 A | 3/2007 |
| CN | 101034536 A | 9/2007 |
| CN | 101095276 A | 12/2007 |
| DE | 10101542 A1 | 4/2002 |
| DE | 10149938 A1 | 5/2003 |
| GB | 2374952 A | 10/2002 |
| JP | 2003218634 A | 7/2003 |
| KR | 1020040046689 A | 5/2004 |
| TW | 201108544 A | 3/2011 |
| WO | 02061930 A1 | 8/2002 |
| WO | 2006078244 A1 | 7/2006 |
| WO | 2009136369 A2 | 11/2009 |

OTHER PUBLICATIONS

Lenoir, Eric "Getting the Most out of Cersmic Capacitors", pp. 1-6, Aug. 1, 2003.

Cockcroft, "Production of high velocity position ions," Proc.Roy. Soc., A, vol. 136, pp. 619-630, 1932.

Yan, et al., "Application of Ceramic Capacitors for Power Electronic Circuit," Liaoning University of Technology, Mar. 15, 2008.

\* cited by examiner

BALANCING VOLTAGES BETWEEN BATTERY BANKS

RELATED APPLICATIONS

The instant application is a continuation of, and hereby claims priority to, pending U.S. patent application Ser. No. 13/360,980, which is titled "Balancing Voltages between Battery Banks," by inventors William C. Athas and Thomas C. Greening, which was filed on 30 Jan. 2012. This application further claims priority to U.S. patent application Ser. No. 12/535,974, which is titled "High-Efficiency Switched-Capacitor Power Conversion," by inventors William C. Athas and P. Jeffrey Ungar, which was filed on 5 Aug. 2009, and which issued as U.S. Pat. No. 8,320,141 on 27 Nov. 2012, of which parent application Ser. No. 13/360,980 is a continuation in part. The above-described applications are incorporated by reference.

BACKGROUND

Field

The disclosed embodiments generally relate to battery packs comprised of multiple battery banks which are coupled together in series. More specifically, the disclosed embodiments relate to a method and an apparatus for balancing voltages between battery banks within a battery pack.

Related Art

Battery performance is critical to the effective operation of portable computing devices, such as laptop computers. To provide higher supply voltages, battery banks inside portable computing devices are typically stacked in series inside a battery pack. This arrangement provides power efficiently because conduction losses are lower in such a series arrangement. (Note that a battery bank can include one or more battery cells which are electrically connected together in parallel.)

However, if the battery banks that comprise the battery pack are not precisely matched in capacity, the battery pack can suffer from an imbalance condition. Such bank imbalance conditions can exist in new battery packs due to manufacturing variations between the banks, or they also can arise over the life of a battery pack as bank capacities degrade at different rates over time. An imbalanced battery pack has reduced capacity because the bank with the highest state-of-charge will cause the charging process to terminate, which means that banks with a lower state-of-charge never get fully charged. Additionally, when the battery pack is discharged, the bank with the least charge can cause the discharging process to stop, even though charge may remain in other banks.

A number of mechanisms are presently used to deal with imbalance conditions in battery banks. "Passive balancers" operate by switching resistances in parallel with selected battery banks during the charging process. These resistances act to divert current around the selected banks during the charging process, which causes the selected banks to charge more slowly, which facilitates equalizing the voltages across the banks during the charging process. Although passive balancers can equalize bank voltages during the charging process, they do not alleviate imbalance problems that arise during the discharging process.

In contrast to passive balancers, "active balancers" are inductor based and can operate at any time, for example while the battery pack is charging, discharging or at rest. Active balancers operate by selectively coupling inductors to battery banks to move current between the battery banks. Unfortunately, such active balancers can create safety problems. For example, if the switching process is not controlled carefully or if there is a failure in a switch, it is possible to push too much current into a battery bank, which can damage the battery bank.

Hence, what is needed is a method and an apparatus for addressing capacity imbalance problems between battery banks without the drawbacks of existing passive balancers or active balancers.

SUMMARY

The disclosed embodiments provide a system that balances voltages between battery banks. The system includes a plurality of battery banks, including a first bank and a second bank, and a first capacitor with a first terminal and a second terminal. The system also includes a first set of switching devices which selectively couple the first and second terminals of the first capacitor to first and second terminals of the first bank, and to first and second terminals of the second bank. The system additionally includes a clocking circuit which generates clock signals with substantially non-overlapping clock phases, including a first phase and a second phase. This clocking circuit is configured to control the first set of switching devices, so that during the first phase the first and second terminals of the first capacitor are coupled to the first and second terminals of the first bank, respectively, and during the second phase the first and second terminals of the first capacitor are coupled to the first and second terminals of the second bank, respectively.

In some embodiments, each battery bank includes one or more battery cells, wherein if a battery bank comprises multiple battery cells, the multiple battery cells are electrically coupled in parallel.

In some embodiments, the plurality of battery cells are electrically coupled in series to form a battery pack.

In some embodiments, the system further comprises a second set of switching devices, and a second capacitor with a first terminal and a second terminal. In these embodiments, the clocking circuit is configured to control the second set of switching devices, so that during the first phase the first and second terminals of the second capacitor are coupled to the first and second terminals of the second bank, respectively, and during the second phase the first and second terminals of the second capacitor are coupled to the first and second terminals of the first bank, respectively.

In some embodiments, the first set of switching devices includes: a first switch which couples the first terminal of the first capacitor to the first terminal of the first bank during the first phase; a second switch which couples the second terminal of the first capacitor to the second terminal of the first bank during the first phase; a third switch which couples the first terminal of the first capacitor to the first terminal of the second bank during the second phase; and a fourth switch which couples the second terminal of the first capacitor to the second terminal of the second bank during the second phase.

In some embodiments, the plurality of banks also includes a third bank which is electrically coupled in series with the first bank and the second bank. The system also includes a third capacitor with a first terminal and a second terminal. In these embodiments, the first set of switching devices and the clocking circuit are configured so that during the first phase the first and second terminals of the third capacitor are coupled to the first and second terminals of the second bank, respectively, and during the second phase the first and second terminals of the third capacitor are coupled to the first and second terminals of the third bank, respectively.

In some embodiments, the clocking circuit is a resonant LC oscillator circuit which includes at least one inductance and at least one capacitance.

In some embodiments, the resonant LC oscillator circuit includes: a first phase output; a second phase output; a first inductor coupled between a voltage source and the first phase output; a second inductor coupled between the voltage source and the second phase output; a first transistor with a source terminal coupled to a base voltage, a drain terminal coupled to the first phase output, and a gate terminal coupled to the second phase output; and a second transistor with a source terminal coupled to the base voltage, a drain terminal coupled to the second phase output, and a gate terminal coupled to the first phase output.

In some embodiments, the first set of switching devices includes power MOSFETs (Metal-Oxide-Semiconductor Field-Effect Transistors).

In some embodiments, the first capacitor includes one or more ultra-low-ESR and ultra-low-ESL ceramic capacitors.

In some embodiments, the clocking circuit is configured to run intermittently to balance voltages between the first bank and the second bank.

In some embodiments, the clocking circuit is configured to run continuously to maintain balanced voltages between the first bank and the second bank.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Voltage Balancer

Figure 1:
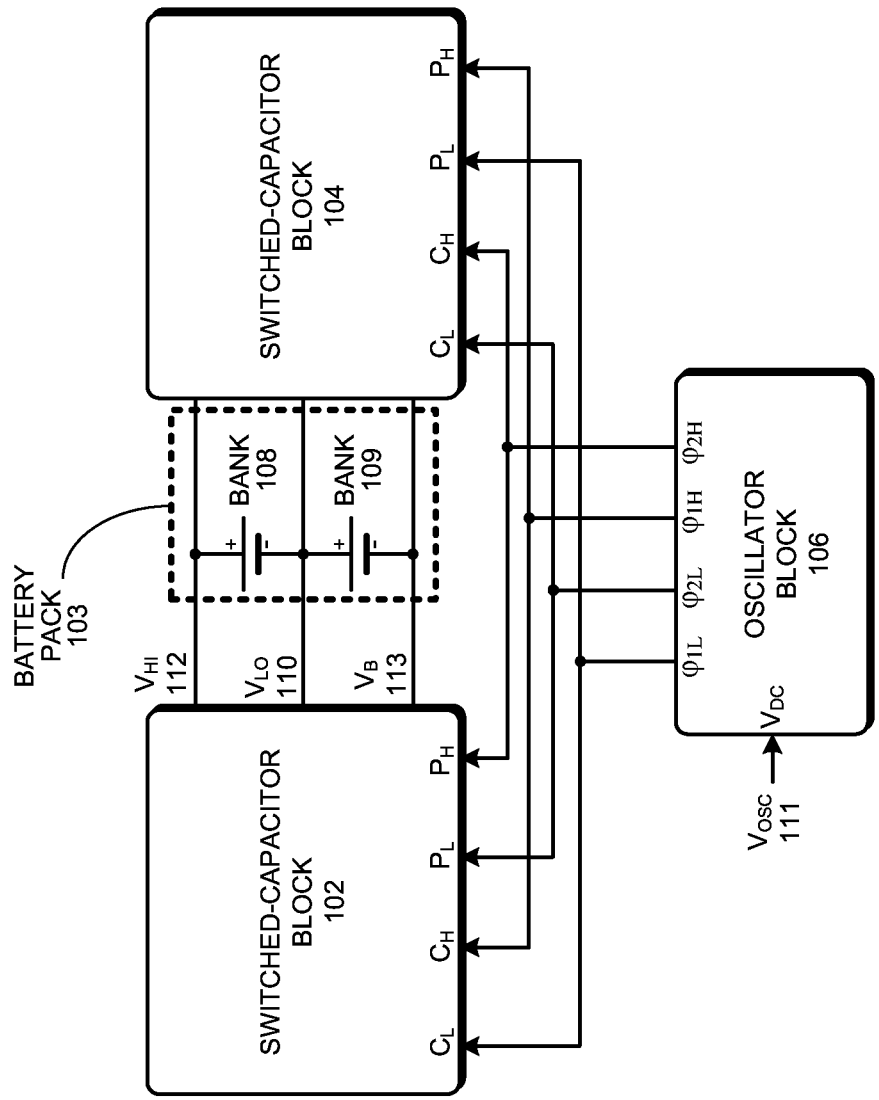
FIG. 1 illustrates a voltage balancer coupled to a battery pack in accordance with an embodiment of the present invention.

FIG. 1 illustrates a voltage balancer coupled to a battery pack 103 in accordance with an embodiment of the present invention. Battery pack 103 comprises two battery banks 108-109, which are electrically coupled together in series, wherein the voltage across battery bank 109 is $V_{LO}-V_B$ and the voltage across battery bank 108 is $V_{HI}-V_{LO}$. Note that each battery bank 108-109 includes one or more battery cells, wherein if a battery bank comprises multiple battery cells, the multiple battery cells are electrically coupled in parallel.

In the embodiment illustrated in FIG. 1, an oscillator block 106 receives an oscillator supply voltage $V_{OSC}$ 111 from an oscillator voltage source and produces four versions of the two-phase clock, namely $C_L$, $C_H$, $P_L$ and $P_H$. This two-phase clock controls two switched-capacitor blocks (SCBs) 102 and 104, which selectively switch capacitors between battery banks 108-109 during opposite clock phases. Note that the process of switching the capacitors between battery banks 108-109 acts to equalize the voltages between battery banks 108-109. More specifically, during a first clock phase, SCB 102 couples a first capacitor (see capacitor 210 in FIG. 2) across terminals of battery bank 108, while SCB 104 couples a second capacitor (not shown) across the terminals of battery bank 109. Next, during a second clock phase, SCB 102 couples the first capacitor across terminals of battery bank 109, while SCB 104 couples a second capacitor across the terminals of battery bank 108. Note that using two SCBs 102 and 104 instead of a single SCB tends to smooth out the current flow through the system because current can continually flow into and out of the battery banks 108 and 109 (except for the small amount of time when the capacitors in SCBs 102 and 104 are being switched between battery banks 108 and 109).

Switched-Capacitor Block

Figure 2:
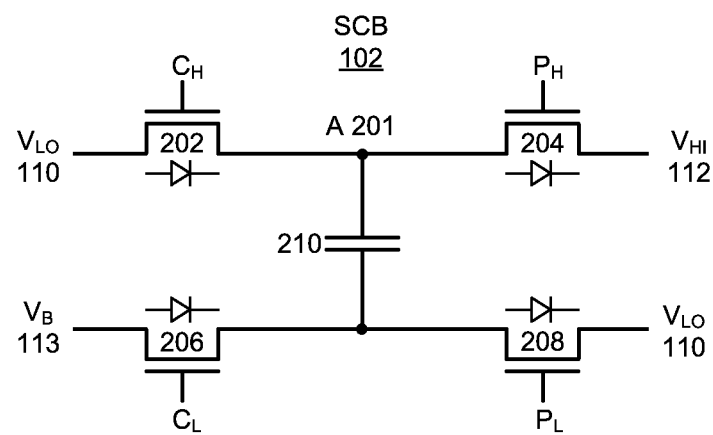
FIG. 2 illustrates the structure of a switched-capacitor block in accordance with an embodiment of the present invention.

FIG. 2 illustrates the structure of an exemplary switched-capacitor block 102 in accordance with an embodiment of the present invention. SCB 102 includes a capacitor 210 (also referred to as a "pump capacitor") and a set of switching devices 202, 204, 206 and 208. In the illustrated embodiment, switching devices 202, 204, 206 and 208 are power Metal-Oxide-Semiconductor Field-Effect Transistors (MOSFETs). Note that FIG. 2 also depicts the directionality of the body diodes for each of the MOSFETs 202, 204, 206 and 208.

FIG. 2 additionally illustrates the connections for MOSFETs 202, 204, 206 and 208. More specifically, MOSFET 202 couples the first terminal of capacitor 210 to $V_{LO}$ 110 under control of clock input $C_H$; MOSFET 206 couples the second terminal of capacitor 210 to the base voltage, $V_B$ 113 under control of clock input $C_L$; MOSFET 204 couples the first terminal of capacitor 210 to $V_{HI}$ 112 under control of clock input $P_H$; and MOSFET 208 couples the second terminal of capacitor 210 to $V_{LO}$ 110 under control of clock input $P_L$.

During the first clock phase, the first terminal of capacitor 210 is coupled to $V_{LO}$ 110, and the second terminal of capacitor 210 is coupled to $V_B$. This causes the voltage across capacitor 210 to become $V_{LO}-V_B$, which is the voltage across battery bank 109 in FIG. 1. During the second clock phase, the first terminal of capacitor 210 is coupled to $V_{HI}$ 112, and the second terminal of capacitor 210 is coupled to $V_{LO}$ 110. This causes the voltage across capacitor 210 to become $V_{HI}-V_{LO}$, which is the voltage across battery bank 108 in FIG. 1. Note that alternately coupling capacitor 210 between battery banks 108 and 109 causes the voltages of battery banks 108 and 109 to equalize. More specifically, if battery bank 108 has a higher voltage than battery bank 109, when capacitor 210 is coupled to battery bank 108, charge will move from battery bank 108 into capacitor 102, and when capacitor 210 is subsequently coupled to battery bank 109, charge will move from capacitor 210 into battery bank 109.

In one embodiment, capacitor 210 is implemented using a bank of parallel capacitors, wherein each capacitor can be a 100 μF ceramic type capacitor. The second terminal of the capacitor bank swings between $V_B$ and $V_{LO}$. Hence, the gate drive for MOSFET 208, which couples the second terminal of the capacitor bank to $V_{LO}$, must have a voltage swing of at least $V_G+V_{LO}$, wherein $V_G$ is the gate drive voltage required for $R_{ds}$(on) to reach its minimal on resistance. Likewise, the first terminal of capacitor 210 swings between $V_{LO}$ and $V_{HI}$. Hence, it is not necessary for MOSFETs 202 and 204, which are connected to the first terminal of the capacitor bank, to swing below $V_{LO}$. These gate drive signals can be biased by the input voltage to swing between $V_{LO}+V_B+V_G$ and $V_{HI}+V_B+V_G$. Note that the energy required to drive each gate is proportional to $(V_{LO}+V_G)^2$.

Voltage Balancer for Three Battery Banks

Figure 3A:
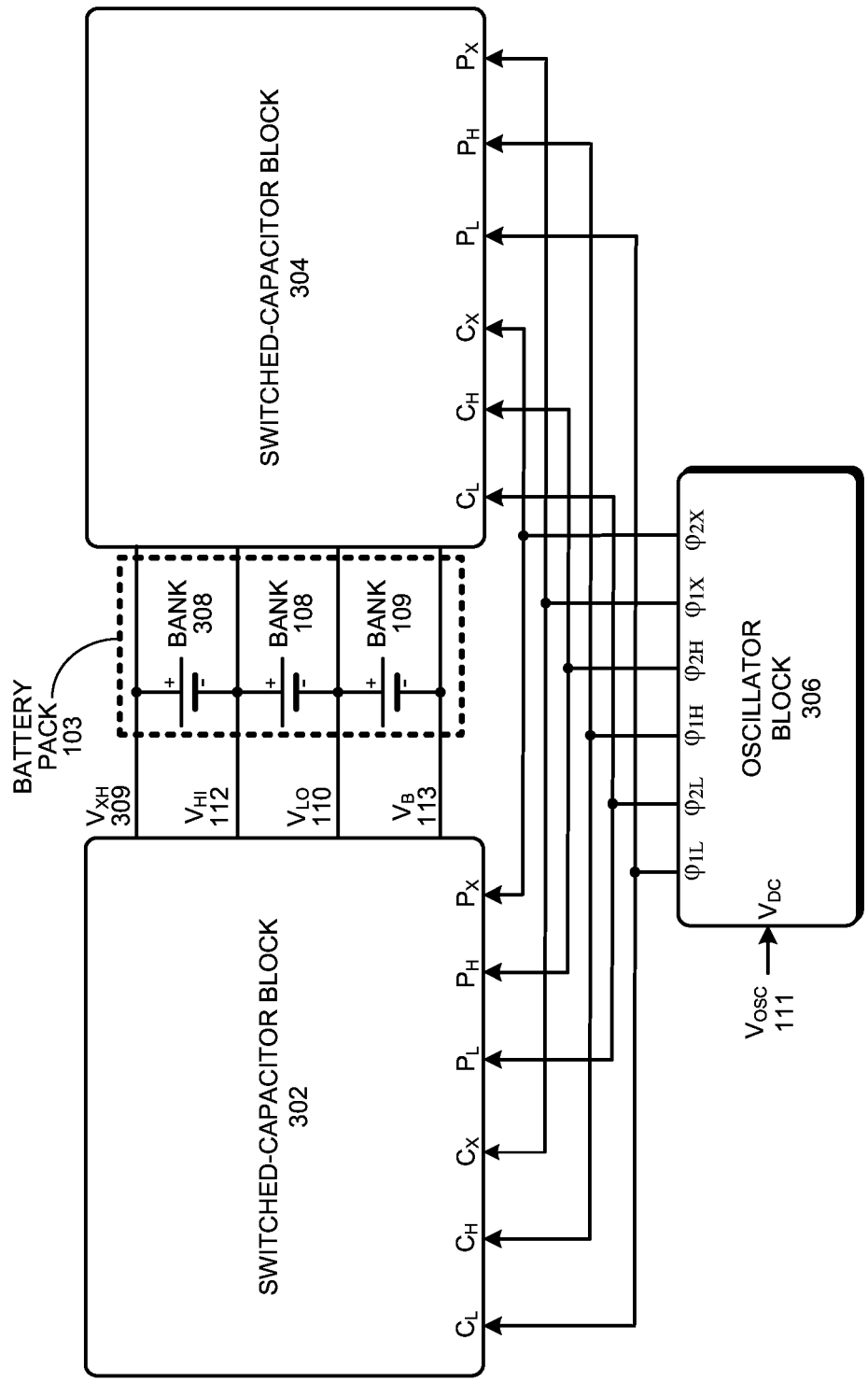
FIG. 3A illustrates a voltage balancer for three battery banks in accordance with an embodiment of the present invention.

FIG. 3A illustrates a voltage balancer for three battery banks in accordance with an embodiment of the present invention. The system illustrated in FIG. 3A is similar to the system illustrated in FIG. 1, except that the battery pack 103 comprises three battery banks 109, 108 and 308, which are coupled together in series, wherein the voltage across battery bank 109 is $V_{LO}-V_B$, the voltage across battery bank 108 is $V_{HI}-V_{LO}$, and the voltage across battery bank 308 is $V_{XH}-V_{HI}$. Also, in comparison to oscillator block 106 in FIG. 1, oscillator block 306 produces two additional signals $\phi_{1X}$ and $\phi_{2X}$, which feed into additional inputs $C_X$ and $P_X$ in switched-capacitor blocks 302-304.

Figure 3B:
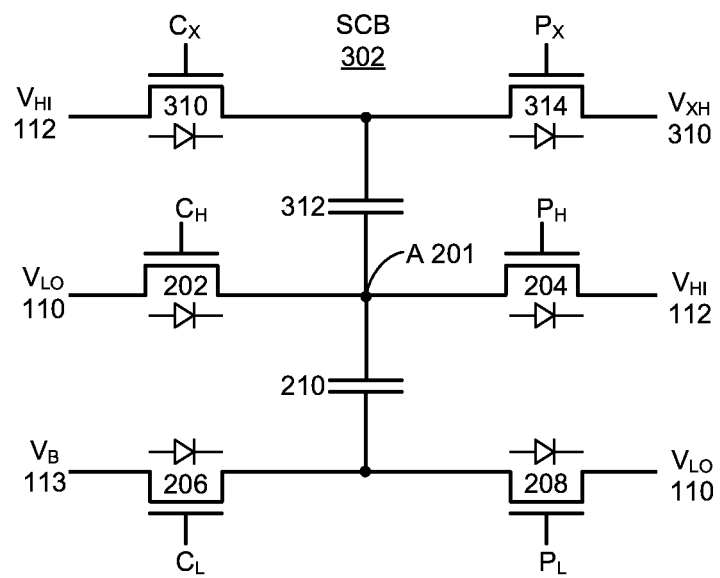
FIG. 3B illustrates the structure of an associated switched-capacitor block in accordance with an embodiment of the present invention.

FIG. 3B illustrates the structure of switched-capacitor block 302 in accordance with an embodiment of the present invention. Note that FIG. 3B contains all of the circuitry illustrated in FIG. 2 and additionally contains two transistors 310 and 314, and an additional capacitor 312, which is stacked on top of capacitor 210. Also note that the lower terminal of capacitor 312 attaches to node A 201.

During the first clock phase, the first terminal of capacitor 312 is coupled to $V_{HI}$ 112, and the second terminal of capacitor 312 is coupled to $V_{LO}$ 110. This causes the voltage across capacitor 312 to become $V_{HI}-V_{LO}$, which is the voltage across battery bank 108 in FIG. 3A. During the second clock phase, the first terminal of capacitor 312 is coupled to $V_{HX}$ 309, and the second terminal of capacitor 312 is coupled to $V_{HI}$ 112. This causes the voltage across capacitor 312 to become $V_{XH}-V_{HI}$, which is the voltage across battery bank 308 in FIG. 3A. Note that alternately coupling capacitor 312 between battery banks 108 and 308 equalizes voltages between battery banks 108 and 308. At the same time, capacitor 210 is being switched between battery banks 109 and 108, which equalizes the voltages between battery banks 109 and 108.

Resonant Clocking Circuit

Figure 4:
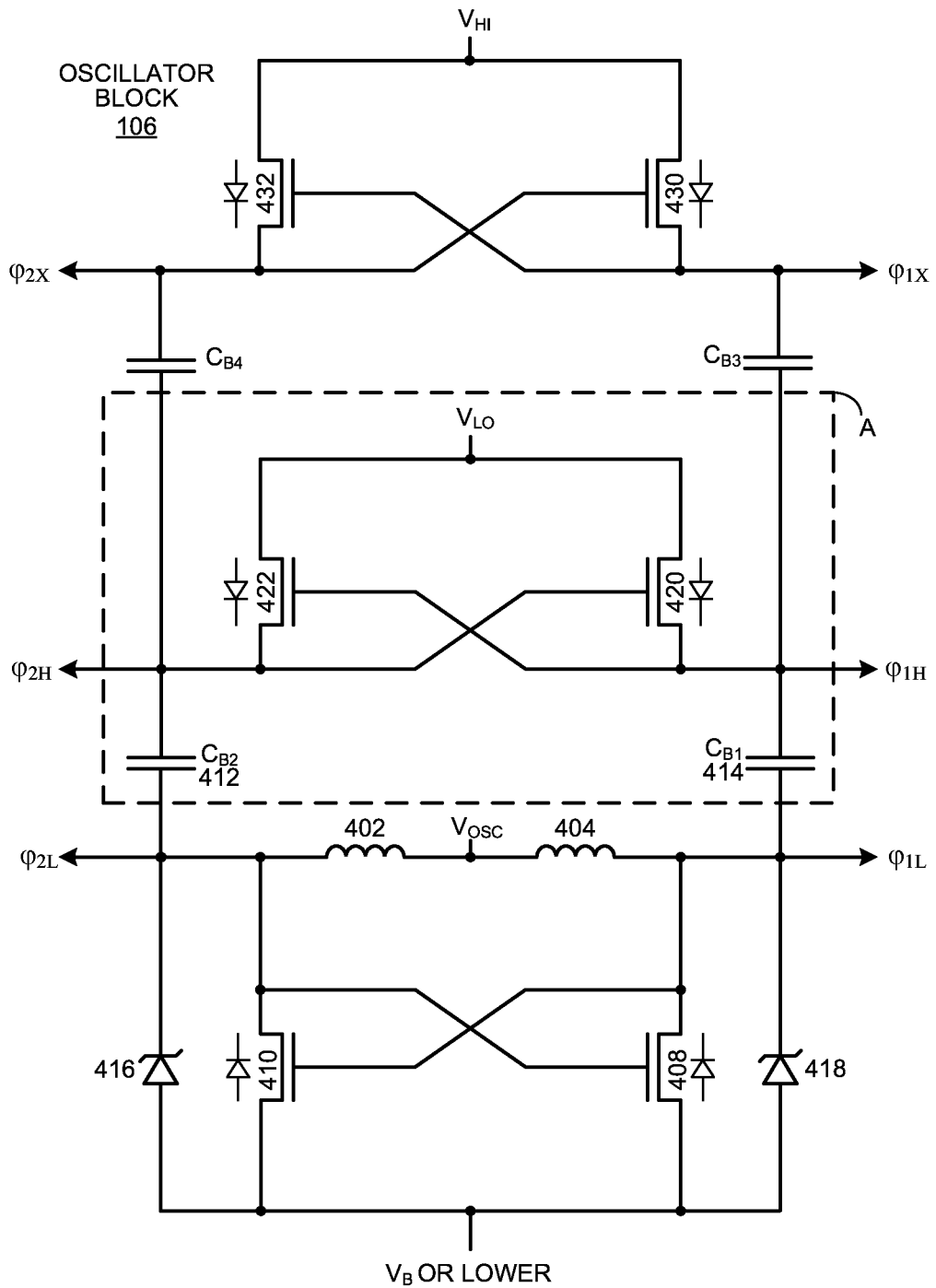
FIG. 4 illustrates a resonant-clocking circuit in accordance with an embodiment of the present invention.

FIG. 4 illustrates a resonant clocking circuit which can be used to implement oscillator block 106 in FIG. 1 or oscillator block 306 in FIG. 3A in accordance with an embodiment of the present invention. Referring to the bottom portion of FIG. 4, this resonant clocking circuit includes two complementary circuit sections that produce opposing clock phases. The first circuit section includes inductor 402 and FET 410 and produces output $\phi_{2L}$. The second complementary circuit section includes inductor 404 and FET 408 and produces output $\phi_{1L}$, wherein $\phi_{1L}$ and $\phi_{2L}$ provide opposite clock phases. Note that FETs 408 and 410 are cross-coupled so that the control input for each of FETs 408 and 410 is taken from the output of the complementary circuit section. Also note that the gate capacitance for each FET is lumped in with the output-load capacitance for the opposing clock phase. (Note further that the load capacitance is the gate capacitance at the SCB.)

During operation of this resonant clocking circuit, energy oscillates back and forth between inductive and capacitive circuit elements without a significant conductive or switching loss. More specifically, in the first circuit section, energy oscillates between inductor 402 and the load capacitance for output $\phi_{2L}$, which is lumped in with the gate capacitance for the opposing FET 408. Similarly, in the second circuit section, energy oscillates between inductor 404 and the load capacitance for output $\phi_{1L}$, which is lumped in with the gate capacitance for the opposing FET 410.

The top portion of FIG. 4 illustrates corresponding circuitry which generates outputs $\phi_{1H}$ and $\phi_{2H}$. The voltages on outputs $\phi_{1H}$ and $\phi_{2H}$ track the voltages on outputs $\phi_{1L}$ and $\phi_{2L}$, but are biased to be at higher voltage levels. This is accomplished by using two bootstrap capacitors, $C_{B1}$ 414 and $C_{B2}$ 412, and two cross-coupled FETs 422 and 420 that clamp the elevated clock output to $V_{LO}$ during one phase and then follow the clock output with a positive offset of $V_{LO}$ during the other phase. The elevated voltage levels on outputs $\phi_{1H}$ and $\phi_{2H}$ can be used to drive MOSFETs 202 and 204 which are illustrated in FIG. 2. As mentioned in the discussion above, these MOSFETs need gate drive signals that swing between $V_{LO}$ and $V_{HI}+V_G$. As is illustrated in the top portion of FIG. 4, the dotted line box A can be stacked again to provide the "extra-high" (XH) outputs of FIG. 3B.

Note that Zener diodes 416 and 418 (which, for example, can be 19V Zener diodes) are coupled between outputs $\phi_{2L}$ and $\phi_{1L}$, respectively, and ground to protect the circuit against large transient voltages during power up. Note also that transistors 420 and 422 could be replaced with ordinary diodes with an anode coupled to $V_{LO}$ and a cathode coupled to $\phi_{1H}$ or $\phi_{2H}$.

Voltage-Balancing Process

Figure 5:
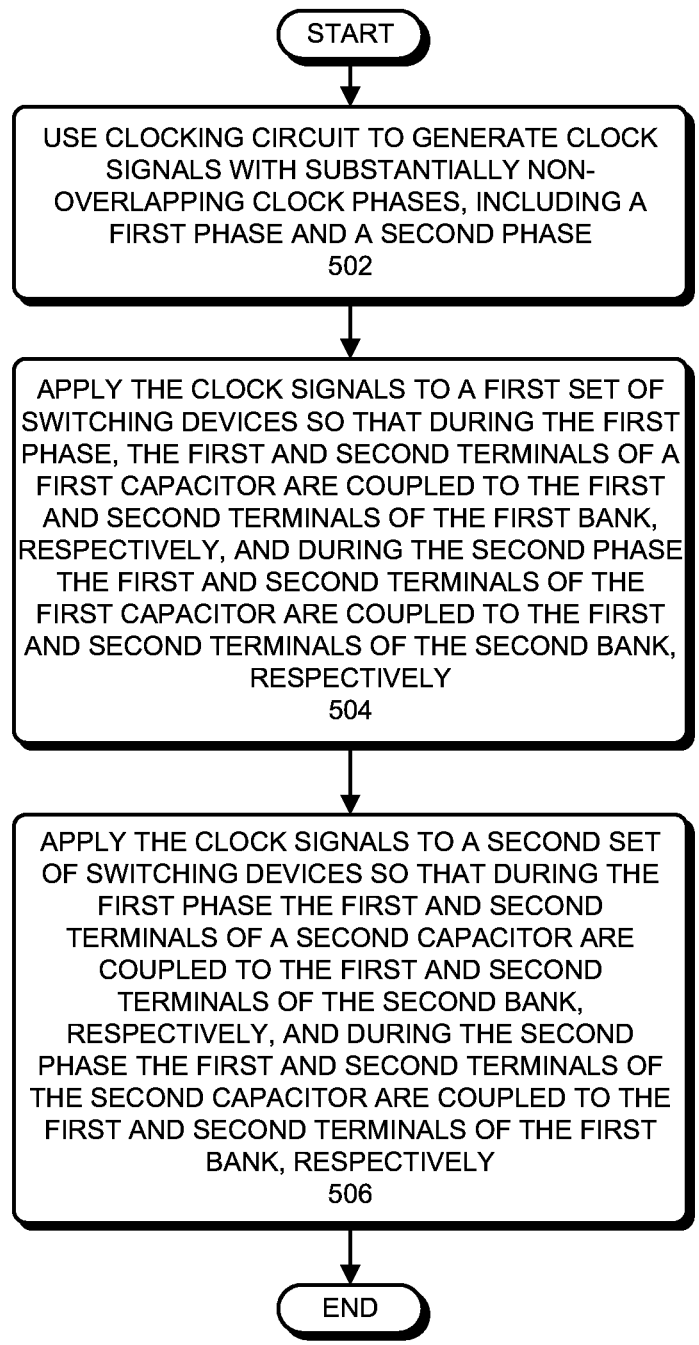
FIG. 5 presents a flowchart illustrating the voltage-balancing process in accordance with an embodiment of the present invention.

FIG. 5 presents a flowchart illustrating the voltage-balancing process in accordance with an embodiment of the present invention. During operation, the system uses a clocking circuit to generate clock signals with substantially non-overlapping clock phases, including a first phase and a second phase (step 502). The system applies clock signals to a first set of switching devices so that during the first phase, the first and second terminals of a first capacitor are coupled to the first and second terminals of the first bank, respectively, and during the second phase the first and second terminals of the first capacitor are coupled to the first and second terminals of the second bank, respectively (step 504). The system also applies the clock signal to a second set of switching devices, so that during the first phase the first and second terminals of a second capacitor are coupled to the first and second terminals of the second bank, respectively, and during the second phase the first and second terminals of the second capacitor are coupled to the first and second terminals of the first bank, respectively (step 506).

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A system that balances voltages between battery banks, comprising:
   a plurality of battery banks comprising a first bank, a second bank, and a third bank;
   a plurality of capacitors comprising a first capacitor and a second capacitor;
   a first set of switching devices coupled between to the plurality of battery banks and the plurality of capacitors; and
   a clocking circuit coupled to the first set of switching devices, the clocking circuit configured to generate a first phase output and a second phase output that control the first set of switching devices so that the plurality of capacitors alternate between being coupled to a first subset of the plurality of battery banks and a second subset of the plurality of battery banks;
   wherein the clocking circuit comprises:
     a first inductor coupled between a voltage source and the first phase output;
     a third capacitor coupled to the first phase output;
     a second inductor coupled between the voltage source and the second phase output;
     a fourth capacitor coupled to the second phase output;
     a first transistor with a source terminal coupled to a base voltage, a drain terminal coupled to the first phase output, and a gate terminal coupled to the second phase output; and
     a second transistor with a source terminal coupled to the base voltage, a drain terminal coupled to the second phase output, and a gate terminal coupled to the first phase output;
     wherein the clocking circuit is configured to oscillate energy between the first inductor and the third capacitor and between the second inductor and the fourth capacitor.

2. The system of claim 1, further comprising:
   a first terminal and a second terminal coupled to the first capacitor;
   a third terminal and a fourth terminal coupled to the second capacitor;
   a fifth terminal and a sixth terminal coupled to the first bank;
   a seventh terminal and an eighth terminal coupled to the second bank; and
   a ninth terminal and a tenth terminal coupled to the third bank;
   wherein the first and second phase outputs are substantially non-overlapping; and
   wherein the clocking circuit controls the switching devices so that:
     during the first phase output, the first terminal and the second terminal are coupled to the fifth terminal and the sixth terminal, respectively, and the third terminal and the fourth terminal are coupled to the seventh terminal and the eighth terminal, respectively, and
     during the second phase output, the first terminal and the second terminal are coupled to the seventh terminal and the eighth terminal, respectively, and the third terminal and the fourth terminal are coupled to the ninth terminal and the tenth terminal, respectively.

3. The system of claim 1, wherein each battery bank comprises one or more battery cells, and wherein the multiple battery cells are electrically coupled in one of the following ways:
   the multiple battery cells are electrically coupled in parallel; and
   the multiple battery cells are electrically coupled in series.

4. The system of claim 2, further comprising:
   a fifth capacitor and a sixth capacitor in the plurality of capacitors;
   a second set of switching devices coupled between the plurality of battery banks and the plurality of capacitors, and coupled to the clocking circuit;
   an eleventh terminal and a twelfth terminal coupled to the fifth capacitor; and
   a thirteenth terminal and a fourteenth terminal coupled to the sixth capacitor;
   wherein the clocking circuit controls the second set of switching devices so that:
     during the first phase output, the eleventh terminal and the twelfth terminal are coupled to the seventh terminal and the eighth terminal, respectively, and the thirteenth terminal and the fourteenth terminal are coupled to the ninth terminal and the tenth terminal, respectively, and
     during the second phase output, the eleventh terminal and the twelfth terminal are coupled to the fifth terminal and the sixth terminal, respectively, and the thirteenth terminal and the fourteenth terminal are coupled to the seventh terminal and the eighth terminal, respectively.

5. The system of claim 2, wherein the first set of switching devices comprises:
   a first switch which couples the first terminal to the fifth terminal during the first phase output;
   a second switch which couples the second terminal to the sixth terminal and the third terminal to the seventh terminal during the first phase output;
   a third switch which couples the fourth terminal to the eighth terminal during the first phase output;
   a fourth switch which couples the first terminal to the seventh terminal during the second phase output;
   a fifth switch which couples the second terminal to the eight terminal and the third terminal to the ninth terminal during the second phase output; and a sixth switch which couples the fourth terminal to the tenth terminal during the second phase output.

6. The system of claim 1, wherein the first set of switching devices comprises power MOSFETs (Metal-Oxide-Semiconductor Field-Effect Transistors).

7. The system of claim 1, wherein the first capacitor comprises one or more ultra-low-ESR and ultra-low-ESL ceramic capacitors.

8. The system of claim 1, wherein the clocking circuit is configured to run intermittently to balance voltages between the first bank, the second bank, and the third bank.

9. The system of claim 1, wherein the clocking circuit is configured to run continuously to maintain balanced voltages between the first bank, the second bank, and the third bank.

10. A battery pack that balances voltages between battery banks, comprising:
a plurality of battery banks, comprising a first bank, a second bank, and a third bank, wherein the plurality of battery banks are electrically coupled in series, wherein each battery bank comprises one or more battery cells, wherein if a battery bank comprises multiple battery cells, the multiple battery cells are electrically coupled in parallel;
a plurality of capacitors comprising a first capacitor and a second capacitor;
a first set of switching devices coupled between to the plurality of battery banks and the plurality of capacitors; and
a clocking circuit coupled to the first set of switching devices, the clocking circuit configured to generate a first phase output and a second phase output that control the first set of switching devices so that the plurality of capacitors alternate between being coupled to a first subset of the plurality of battery banks and a second subset of the plurality of battery banks;
wherein the clocking circuit comprises:
a first inductor coupled between a voltage source and the first phase output;
a third capacitor coupled to the first phase output;
a second inductor coupled between the voltage source and the second phase output;
a fourth capacitor coupled to the second phase output;
a first transistor with a source terminal coupled to a base voltage, a drain terminal coupled to the first phase output, and a gate terminal coupled to the second phase output; and
a second transistor with a source terminal coupled to the base voltage, a drain terminal coupled to the second phase, and a gate terminal coupled to the first phase output;
wherein the clocking circuit is configured to oscillate energy between the first inductor and the third capacitor and between the second inductor and the fourth capacitor.

11. The battery pack of claim 10, further comprising:
a first terminal and a second terminal coupled to the first capacitor;
a third terminal and a fourth terminal coupled to the second capacitor;
a fifth terminal and a sixth terminal coupled to the first bank;
a seventh terminal and an eighth terminal coupled to the second bank; and
a ninth terminal and a tenth terminal coupled to the third bank;
wherein the first and second phase outputs are substantially non-overlapping; and
wherein the clocking circuit controls the switching devices so that:
during the first phase output, the first terminal and the second terminal are coupled to the fifth terminal and the sixth terminal, respectively, and the third terminal and the fourth terminal are coupled to the seventh terminal and the eighth terminal, respectively, and
during the second phase output, the first terminal and the second terminal are coupled to the seventh terminal and the eighth terminal, respectively, and the third terminal and the fourth terminal are coupled to the ninth terminal and the tenth terminal, respectively.

12. The battery pack of claim 11, further comprising:
a fifth capacitor and a sixth capacitor in the plurality of capacitors;
a second set of switching devices coupled between the plurality of battery banks and the plurality of capacitors, and coupled to the clocking circuit;
an eleventh terminal and a twelfth terminal coupled to the fifth capacitor; and
a thirteenth terminal and a fourteenth terminal coupled to the sixth capacitor;
wherein the clocking circuit controls the second set of switching devices so that:
during the first phase output, the eleventh terminal and the twelfth terminal are coupled to the seventh terminal and the eighth terminal, respectively, and the thirteenth terminal and the fourteenth terminal are coupled to the ninth terminal and the tenth terminal, respectively, and
during the second phase output, the eleventh terminal and the twelfth terminal are coupled to the fifth terminal and the sixth terminal, respectively, and the thirteenth terminal and the fourteenth terminal are coupled to the seventh terminal and the eighth terminal, respectively.

13. The battery pack of claim 11, wherein the first set of switching devices comprises:
a first switch which couples the first terminal to the fifth terminal during the first phase output;
a second switch which couples the second terminal to the sixth terminal and the third terminal to the seventh terminal during the first phase output;
a third switch which couples the fourth terminal to the eighth terminal during the first phase output;
a fourth switch which couples the first terminal to the seventh terminal during the second phase output;
a fifth switch which couples the second terminal to the eight terminal and the third terminal to the ninth terminal during the second phase output; and
a sixth switch which couples the fourth terminal to the tenth terminal during the second phase output.

14. A method for balancing voltages between a plurality of battery banks, the plurality of battery banks comprising a first bank, a second bank, and a third bank, wherein the first bank, second bank, and third bank are electrically coupled in series, the method comprising:
connecting a clocking circuit to the plurality of battery banks, the clocking circuit configured to generate a first phase output and a second phase output; and
controlling, using the clocking circuit, a first set of switching devices so that a plurality of capacitors comprising a first capacitor and a second capacitor alternates between being coupled to a first subset of the plurality of battery banks and a second subset of the plurality of battery banks;

wherein the clocking circuit comprises:
- a first inductor coupled between a voltage source and the first phase output;
- a third capacitor coupled to the first phase output;
- a second inductor coupled between the voltage source and the second phase output;
- a fourth capacitor coupled to the second phase output;
- a first transistor with a source terminal coupled to a base voltage, a drain terminal coupled to the first phase, and a gate terminal coupled to the second phase; and
- a second transistor with a source terminal coupled to the base voltage, a drain terminal coupled to the second phase, and a gate terminal coupled to the first phase output;
- wherein the clocking circuit is configured to oscillate energy between the first inductor and the third capacitor and between the second inductor and the fourth capacitor.

15. The method of claim 14, wherein:
a first terminal and a second terminal are coupled to the first capacitor;
a third terminal and a fourth terminal are coupled to the second capacitor;
a fifth terminal and a sixth terminal are coupled to the first bank;
a seventh terminal and an eighth terminal are coupled to the second bank; and
a ninth terminal and a tenth terminal are coupled to the third bank;
wherein the first and second phase outputs are substantially non-overlapping, and wherein:
during the first phase output, the first terminal and the second terminal are coupled to the fifth terminal and the sixth terminal, respectively, and the third terminal and the fourth terminal are coupled to the seventh terminal and the eighth terminal, respectively; and
during the second phase output, the first terminal and the second terminal are coupled to the seventh terminal and the eighth terminal, respectively, and the third terminal and the fourth terminal are coupled to the ninth terminal and the tenth terminal, respectively.

16. The method of claim 15, wherein:
the plurality of capacitors further comprises a fifth capacitor and a sixth capacitor;
a second set of switching devices are coupled between the plurality of battery banks and the plurality of capacitors, and are coupled to the clocking circuit;
an eleventh terminal and a twelfth terminal are coupled to the fifth capacitor; and
a thirteenth terminal and a fourteenth terminal are coupled to the sixth capacitor;
wherein the method further comprises, controlling, using the clocking circuit, the second set of switching devices so that:
during the first phase output, the eleventh terminal and the twelfth terminal are coupled to the seventh terminal and the eighth terminal, respectively, and the thirteenth terminal and the fourteenth terminal are coupled to the ninth terminal and the tenth terminal, respectively, and
during the second phase output, the eleventh terminal and the twelfth terminal are coupled to the fifth terminal and the sixth terminal, respectively, and the thirteenth terminal and the fourteenth terminal are coupled to the seventh terminal and the eighth terminal, respectively.

17. The method of claim 14, wherein generating, using the clocking circuit, the first and second phase outputs comprises intermittently running the clocking circuit to balance voltages between the first bank and the second bank.

* * * * *